May 28, 1968
L. A. CADMUS
3,385,062
BRAKE SYSTEM
Filed May 9, 1966
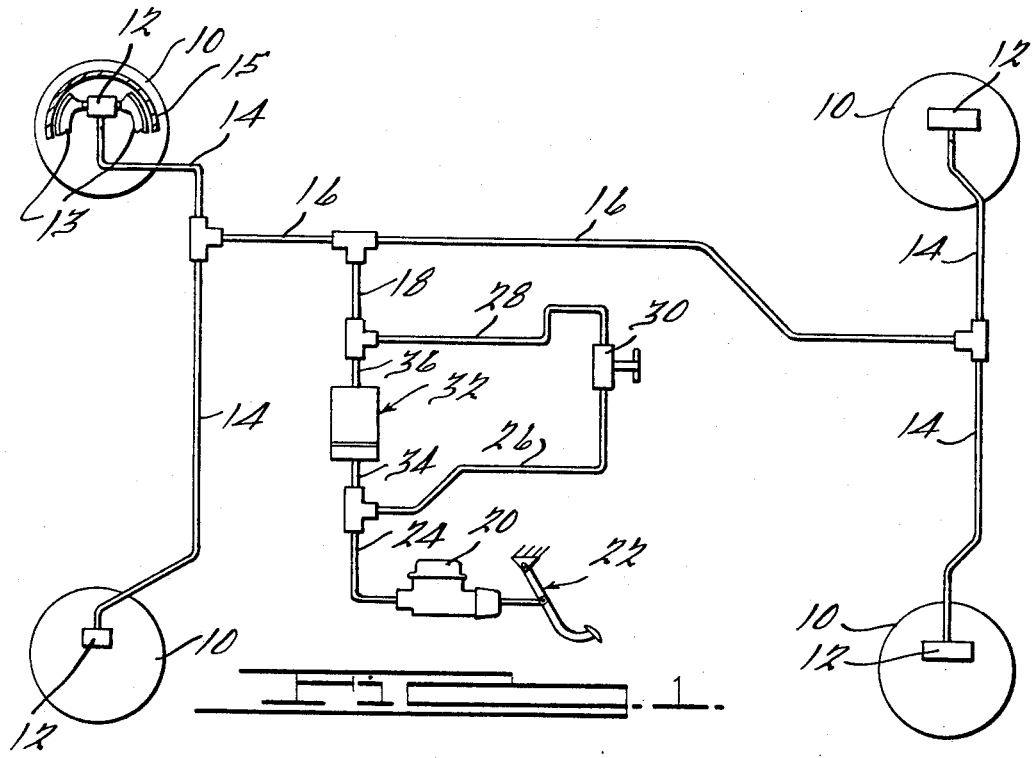
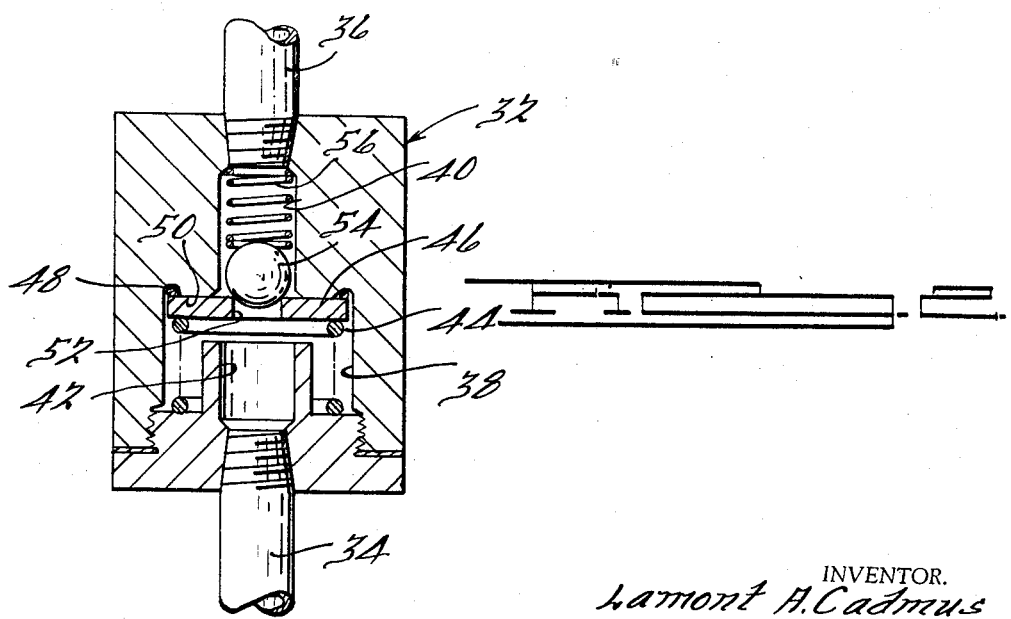
INVENTOR.
Lamont A. Cadmus
BY
Carnes, Dickey & Pierce
ATTORNEYS.

United States Patent Office 3,385,062
Patented May 28, 1968

3,385,062
BRAKE SYSTEM
Lamont A. Cadmus, Sylvania Township, Lucas County, Ohio, assignor to Kaiser Jeep Corporation, Toledo, Ohio, a corporation of Nevada
Filed May 9, 1966, Ser. No. 548,481
6 Claims. (Cl. 60—54.5)

ABSTRACT OF THE DISCLOSURE

A brake system having a valve selectively operable for maintaining the brakes in engagement with a preselected pressure upon actuation by the vehicle operator.

---

The present invention relates to brake systems for use with automotive vehicles.

In many instances, specifically with military or off the road vehicles, an automotive vehicle is operated in a locality in which the wheels are submerged, or partly submerged, in water. If the brake linings become wet or soaked, they will be ineffective for a substantial time period to cause braking of the vehicle. Therefore, it is an object of the present invention to provide a novel system for protecting the brake linings of an automotive vehicle from being rendered ineffective by exposure to water.

It is a general object of the present invention to provide for improved brake system.

It is another object of the present invention to provide for an improved brake system for preventing loss of effectiveness of the brakes due to operation of the vehicle in conditions in which the wheels of the vehicle are completely or at least partially submerged.

Other objects, features, and advantages of the present invention will become apparent from the subsequent description and the appended claims, taken in conjunction with the accompanying drawings, in which:

FIGURE 1 is a general schematic diagram showing the brake assembly of the present invention and includes a two-way valve; and FIGURE 2 is a detailed sectional view to increased scale of the two-way valve of the system of FIGURE 1.

In many off-the-road or military applications, an automotive vehicle is subjected to conditions in which its wheels will be partially or totally immersed in water, i.e., as in fording a stream, etc. With ordinary wheel constructions, water can eventually reach the brake linings and if sufficient water is present the result will be loss of braking at least until the linings have had an opportunity to dry. In the system of the present invention, means are provided whereby the linings can be selectively maintained in slight engagement with the brake drums of the wheels under these adverse water conditions such that water located in the brake drum will not engage the face of the brake lining and hence the lining will not become soaked and there will be no subsequent loss of braking effectiveness. At the same time, the pressure is maintained slight enough such that the wheels of the vehicle can be driven through the water without undue braking or wear to the linings. In addition, with the brakes under engagement with this slight pressure, some heat is generated to cause drying out of the brake drums. With the brake linings in this slight engagement with the brake drum, conditions may arise in which it is desired that additional brake pressure be applied and vehicle braking be attained. In the system of the present invention this can be accomplished and additional braking pressure can be transmitted to the wheel cylinders and added braking obtained while the system is in the condition maintaining the linings in slight pressurized engagement with the brake drums. Upon release of the added braking pressure, the system of the present invention will return the brake linings to their selected condition of slightly pressurized engagement with the brake drums. When the adverse water conditions have been passed, the system can be placed in a condition in which the slight braking pressure can be eliminated and normal brake operation is provided.

Looking now to the drawings, in FIGURE 1 the wheel assemblies of a vehicle are partially shown and are generally indicated by the numeral 10. Each assembly 10 is provided with braking apparatus (which can be of conventional construction and hence the details of which are omitted for purposes of simplicity); this braking apparatus includes individual brake cylinders 12 which are operable with brake shoes 13 which are engageable with a brake drum 15 (only one set of brake shoes 13 and one drum 15 are shown, it being understood that the other assemblies 10 are similarly constructed).

Each of the wheel cylinders 12 is connected to a fluid conduit 14 with pairs of the conduits 14 being connected together to one of two fluid branch lines 16, with the two branch lines 16 being connected to a main fluid conduit 18. The wheel cylinders 12 are actuated by means of fluid pressure applied through the main conduit 18, the branch lines 16 and the connecting conduits 14 by means of fluid pressure from a master cylinder 20, which can be actuated by a conventional linkage generally indicated by the numeral 22. The master cylinder 20 can be of a construction well known in the art and hence the details have been omitted for purposes of simplicity. The master cylinder 20 has an outlet 24 from which fluid pressure is conducted to the main conduit 18 by means of one of two parallelly extending fluid paths. The first fluid path includes conduits 26 and 28 which are serially connected with a bypass valve member 30 located in between. The valve member 30 can be hand or otherwise actuable and can be of a conventional construction whereby the path from conduit 26 to conduit 28 can be either opened or closed. If the valve is to be hand operated it will be located at the driver's compartment so as to be readily accessible to the operator. When the valve 30 is opened, fluid pressure from the master cylinder 20 can be transmitted freely to the main conduit 18 to actuate the wheel cylinders 12. When the valve 30 is closed, fluid pressure is then applied to the wheel cylinders 12 solely by means of the second fluid path previously noted. This latter path includes a two-way valve assembly 32 which has one end connected to outlet 24 by a conduit 34 and has its other end connected to the main conduit 18 by a conduit 36.

The valve assembly 32, shown in FIGURE 2, is a combination valve with the conduit 34 being connected to a chamber 38 which is in communication with the conduit 36 by means of a reduced diameter bore 40. An annular ring portion 42 communicates with the conduit 34 and extends into the chamber 38. Located about the ring portion 42 is a coil spring 44 which is in engagement with an annular washer-like member 46; the spring 44 is biased to urge the washer-like member 46 to its extreme position away from ring portion 42 and in engagement with an annular seal 48 which is located in a groove in a wall 50 which is opposite from the ring portion 42. The washer member 46 is provided with a central opening 52 whereby the chamber 38 can be in communication with the bore portion 40. A ball member 54 is located in clearance relationship in the bore 40 and is of a diameter to seat within the opening 52 and is urged into sealing engagement with the opening 52 by means of a second coil spring member 56. With the ball member 54 in engagement with the opening 52 by means of the spring 56, the fluid path from the conduit 34 through the chamber 38 and through the bore 40 to the conduit 36 is blocked. Likewise, with the washer member 46 in engagement with the seal 48 the path around the washer member 46 is blocked. The coil spring 44 is provided to be of a heavier spring rate and to exert a substantially higher preload than spring 56.

The combination valve 32 will be effective generally only when the off-on valve 30 is closed. When off-on valve 30 is open, a fluid path, bypassing valve 32, is provided to the wheel cylinders 12 whereby the combination valve 32 is generally ineffective. However, when the valve 30 is closed any fluid to the wheel cylinders 12 must then pass through the combination valve 32. In this condition, as the linkage 22 is actuated to energize the brakes pressurized fluid is transmitted from the master cylinder 20 through the outlet 24 and to the conduit 34. The ball 54, which is seated in the opening 52 by only relatively light spring pressure, will be unseated and fluid can then pass around the ball 54 through the conduit 36, to the main conduit 18 and then to the wheel cylinders 12 to effect normal braking. However, as the linkage or mechanism 22 is released and the pressure in the master cylinder 20 is decreased, the pressurized fluid in the cylinders 12 will tend to return to the master cylinder 20. While the return pressure at the wheel cylinders 12 is at a high magnitude, it will be sufficient to unseat the washer member 46 whereby fluid can then return to the master cylinder 20 by means of the conduit 36, the bore 40, the path around the washer member 46, the chamber 38, the ring portion 42 and the conduit 34. However, when the pressure at the wheel cylinders 12 decreases to a preselected minimum magnitude, the preload of the spring 44 will be sufficient to move the washer member 46 to a sealing position with the annular seal 48 to thereby close the return passage to the master cylinder 20. Under this condition the wheel cylinders 12 will be maintained actuated at a preselected pressure. The magnitude of this pressure is selected to just maintain the brake linings in light engagement with the brake drum. As long as this engagement is maintained water cannot be located between the drum and the lining and hence the lining will not become soaked and lose its effectiveness. At the same time the engagement is so slight as to not prevent the wheels 10 of the vehicle from being driven. Since the combination valve 32 will permit increased pressure to be applied to the wheel cylinders 12 via the ball 54, normal braking at pressures above the selected minimum can be obtained. Thus if the vehicle is being operated under conditions in which the wheels and brakes are to be submerged in water, i.e., as when the vehicle is fording a stream, etc., the combination valve 32 by maintaining the brake linings in light contact with the drums of the wheels will prevent the linings from being soaked and from losing their effectiveness. However, if conditions arise in which the brakes must be applied to stop the vehicle, the combination valve 32 will permit increased pressure from the master cylinder 20 to be transmitted whereby normal braking can be provided. When the added braking pressures are removed, the brake linings again will be held in this light engagement with the brake drum. When the adverse water conditions have been passed, the valve 30 can be opened whereby the pressure at the wheel cylinders 12 will be completely released and braking can then be effectuated through the path including the conduits 26 and 28 which path bypasses valve 32 and renders it ineffective. However, at this time, because of the prior maintenance of the brake linings in contact with the drums during the adversely wet conditions, full braking will be immediately available, i.e., no temporary loss of braking due to wet linings.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. A hydraulically actuated brake system for operating the brakes of an automotive vehicle comprising: operating mechanism means actuable for varying the engaging pressure of the brakes up to a maximum engaging pressure, actuating means operatively connected with said mechanism means and being selectively actuable to one condition for maintaining the brakes in engagement at a preselected minimum engaging pressure and for permitting the engaging pressure to be increased above said minimum pressure by actuation of said operating mechanism means, said mechanism means being actuable for transmitting fluid pressure selectively varying in magnitude, said actuating means including fluid circuit means operative with said actuating means in said one condition for maintaining a selected minimum fluid pressure on the brakes and for permitting the fluid pressure to be increased above said minimum fluid pressure by actuation of said mechanism means with the fluid pressure to the brakes returning to said minimum pressure upon deactuation of said mechanism means, said mechanism means including a source of fluid being pressurized by actuation of said mechanism means, said circuit means connecting said source of fluid to the brakes and comprising a valve member and a bypass circuit around said valve member, said valve member being operable for transmitting fluid from said source of fluid and for blocking the return of fluid when the pressure is at said minimum pressure, and bypass means selectively operable by the vehicle operator to a first condition and selectively operable by the vehicle operator to a second condition for preventing actuation of said valve member until actuation by the operator to said first condition.

2. The apparatus of claim 1 with said circuit means including a bypass valve on said bypass circuit with said bypass valve being selectively closed for placing said actuating means in said one condition whereby fluid from said source of fluid to the brakes is transmitted solely through said valve member and with said bypass valve being selectively opened for bypassing said valve member whereby the fluid can flow freely between said source of fluid and the brakes and said valve member is rendered ineffective to maintain said minimum pressure on the brakes.

3. The brake system of claim 1 with said mechanism means comprising a master cylinder and means for actuating said master cylinder, said actuating means comprising fluid circuit means for connecting said master cylinder to the brakes, said fluid circuit means including a two-way valve member for transmitting fluid from said master cylinder to the brakes for substantially the full range of operating pressures of said master cylinder and for maintaining a preselected minimum pressure on the brakes upon deactuation of said master cylinder, and a bypass valve connected to bypass said two-way valve with said bypass valve being selectively operable to a closed position for placing said actuating means in said one condition whereby fluid from said master cylinder to the brakes is transmitted solely through said two-way valve and with said bypass valve being selectively actuable to an open position for bypassing said two-way valve whereby the fluid can flow freely between said master cylinder and the brakes and said two-way valve is rendered ineffective to maintain said minimum pressure on the brakes.

4. The system of claim 3 in which said minimum pressure is selected to be sufficient to maintain the brakes engaged whereby water is maintained out from the brake engaging surface.

5. The system of claim 4 in which said minimum pressure is of a magnitude at which the vehicle can be driven with the braking effect being at a minimum.

6. The system of claim 2 in which said minimum pressure is selected to be just sufficient to maintain the brakes engaged whereby water is substantially maintained out from the brake engaging surfaces.

References Cited

UNITED STATES PATENTS 2,489,929  11/1949  Raybould _____ 188—152.15

MARTIN P. SCHWADRON, *Primary Examiner.*

ROBERT R. BUNEVICH, *Examiner.*